(12) United States Patent
Yang

(10) Patent No.: US 6,675,794 B1
(45) Date of Patent: Jan. 13, 2004

(54) BBQ GRILL WITH IGNITION SYSTEM

(76) Inventor: Chih-Piau Yang, No. 22, Lane Dong-J16, Dong-Jili, Luh-Gaang County, Chang Hua Hsiang (TW)

( * ) Notice: Subject to any disclaimer, the term of this patent is extended or adjusted under 35 U.S.C. 154(b) by 38 days.

(21) Appl. No.: 10/200,750

(22) Filed: Jul. 24, 2002

(51) Int. Cl.⁷ .............................. F24B 3/00; A47G 23/02
(52) U.S. Cl. .................... 126/25 R; 126/30; 126/41 D; 248/146
(58) Field of Search ................. 126/25 R, 9 R, 126/30, 26, 41 R, 40, 41 D; 248/146, 152

(56) References Cited

U.S. PATENT DOCUMENTS

| | | | | |
|---|---|---|---|---|
| 3,688,758 A | * | 9/1972 | Stephen et al. ............ | 126/41 R |
| 3,841,299 A | * | 10/1974 | Tomita ...................... | 126/25 B |
| 3,915,145 A | * | 10/1975 | Tomita ...................... | 126/25 B |
| 5,154,159 A | * | 10/1992 | Knafelc et al. ............ | 126/25 R |
| 5,875,772 A | * | 3/1999 | Saey ......................... | 126/25 R |
| 6,253,760 B1 | * | 7/2001 | Mashburn et al. ......... | 126/41 R |
| 6,557,545 B2 | * | 5/2003 | Williams .................. | 126/25 R |
| 2003/0075166 A1 | * | 4/2003 | Glass ........................ | 126/25 R |

\* cited by examiner

*Primary Examiner*—Alfred Basichas
(74) *Attorney, Agent, or Firm*—Alan D. Kamrath; Rider Bennett, LLP.

(57) ABSTRACT

A BBQ grill with ignition system comprises a furnace seating on a base through a post which is connected to the base by connecting devices. Each connecting device is formed with a thread portion at one end and a block at the other end. The top portion of the post has a subsidiary ignition device which comprises a sliding bed and a support. The support is inserted through the post and secured by bolts thereat.

1 Claim, 6 Drawing Sheets

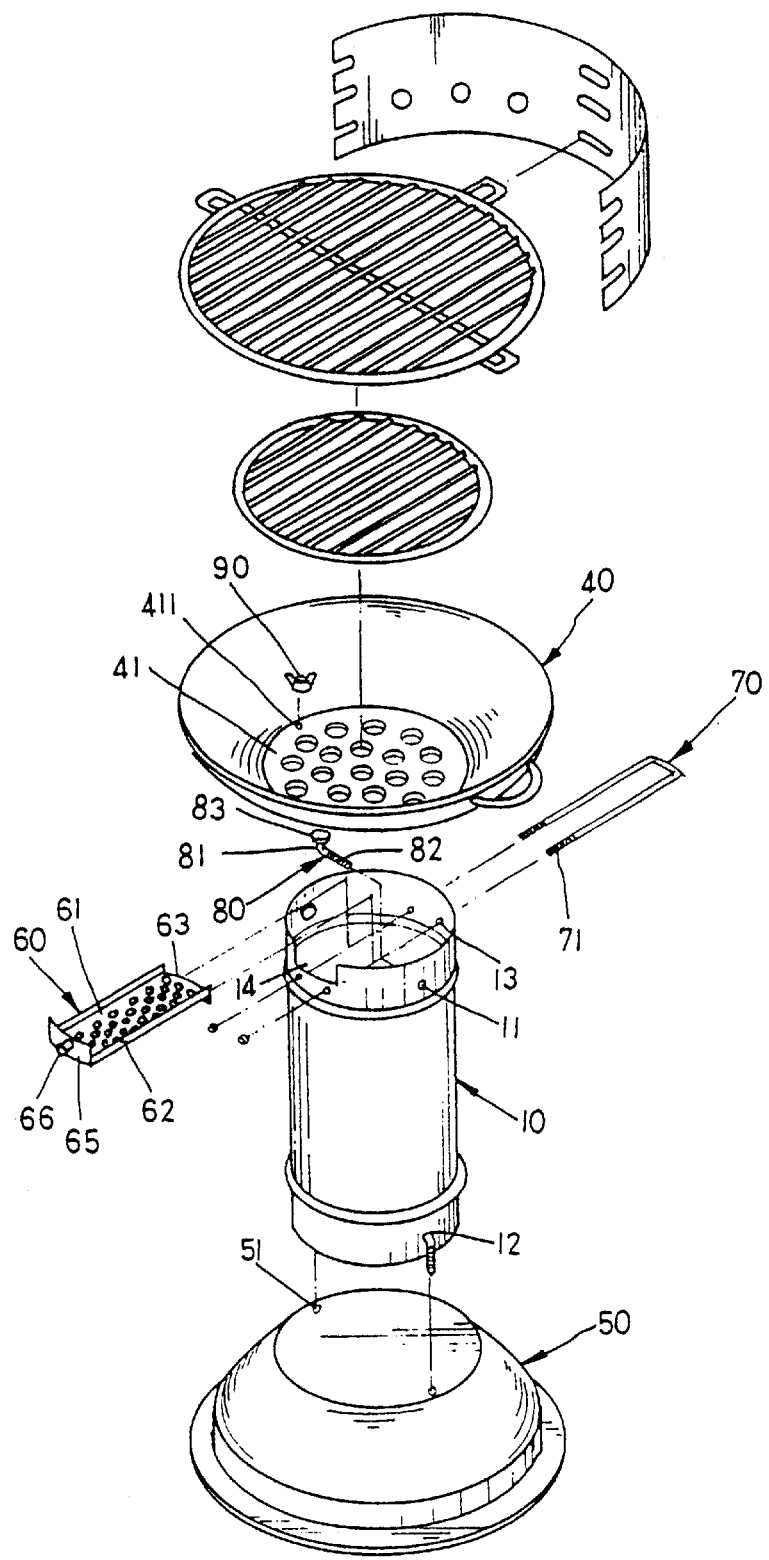
F I G. 2

BBQ GRILL WITH IGNITION SYSTEM

FIELD OF THE INVENTION

This invention relates to a BBQ grill, and more particularly to a grill with self ignition capability.

BACKGROUND OF THE INVENTION

As shown in FIG. 1, a conventional BBQ grill has a post 10 seating on a base 50 and supporting a furnace 20 at its top end. The bottom portion of the furnace 20 extends a lip 21. The outer diameter of the lip 21 is smaller than the inner diameter of the post 10. The base 30 also extends a lip 31 which its outer 10 diameter is also smaller than the inner diameter of the post 10.

To assemble, the lip 21 of the furnace 20 is sleeved into the top end of the post 10 and is screwed tight by screws 22. The lip 31 of the base 30 is sleeved into the bottom end of the post 10 and is screwed tight by screws 32 as well. This embodiment has the following shortcomings:

1. it requires at least four screws 22 and 32 to bind the post 10, the furnace 20 and the base 30 together which needs more cost and is not stable;
2. the product has no auxiliary ignition device;
3. both of the furnace 20 and the post 30 have to form separate lips 21 and 31 which increase the cost.

SUMMARY OF THE INVENTION

It is the primary object of the present invention to provide a BBQ grill with ignition system which is easy to assemble and disassemble.

It is another object of the present invention to provide a BBQ grill with ignition system which enables to self-ignite the charcoal.

It is a further object of the present invention to provide a BBQ grill with ignition system which design is simple and requires less manpower to install.

BRIEF DESCRIPTION OF THE DRAWINGS

FIG. 2 is an exploded view of the present invention;

DETAILED DESCRIPTION OF THE PREFERRED EMBODIMENT

Figure 1:
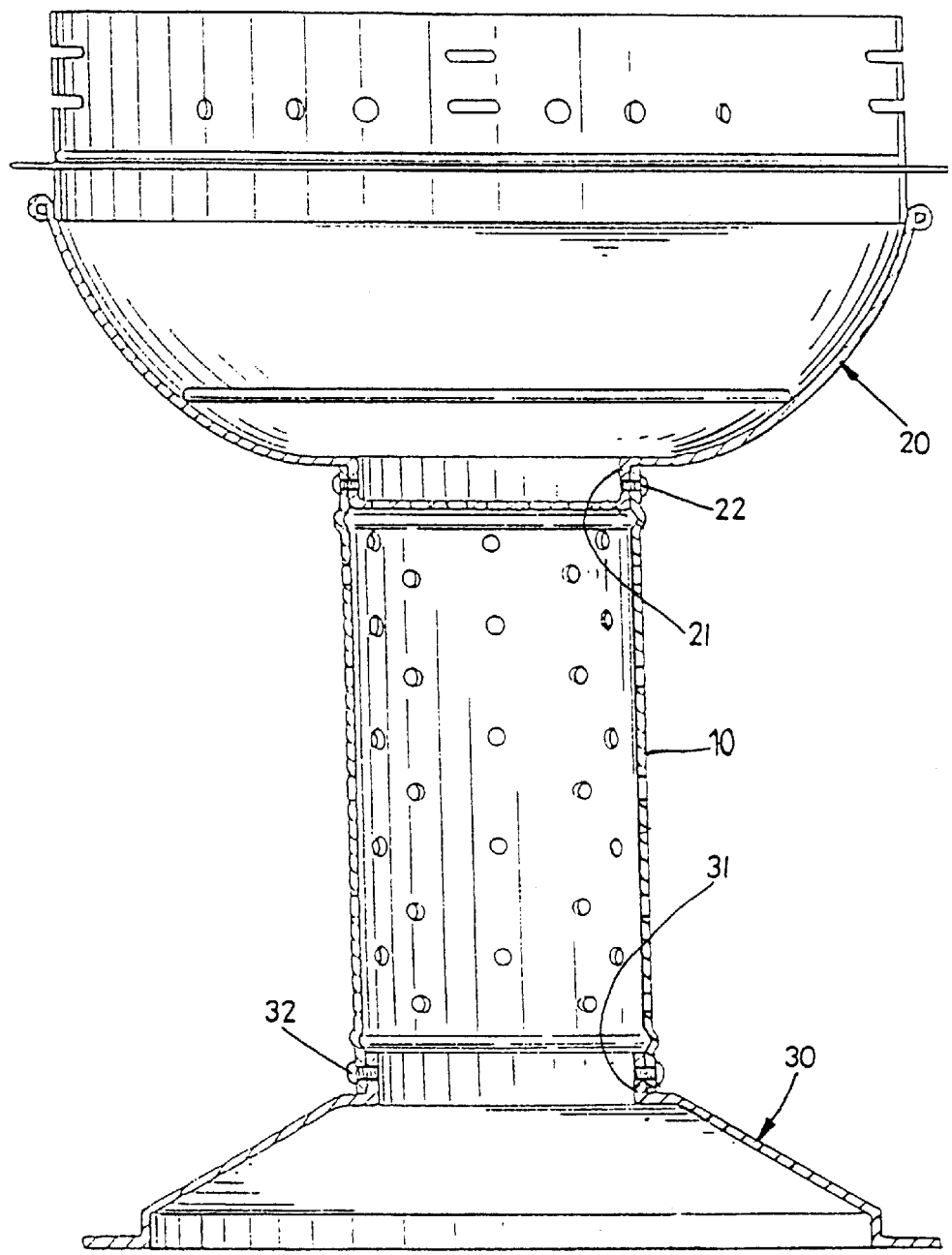
FIG. 1 is a side view of a prior art.
Figure 3:
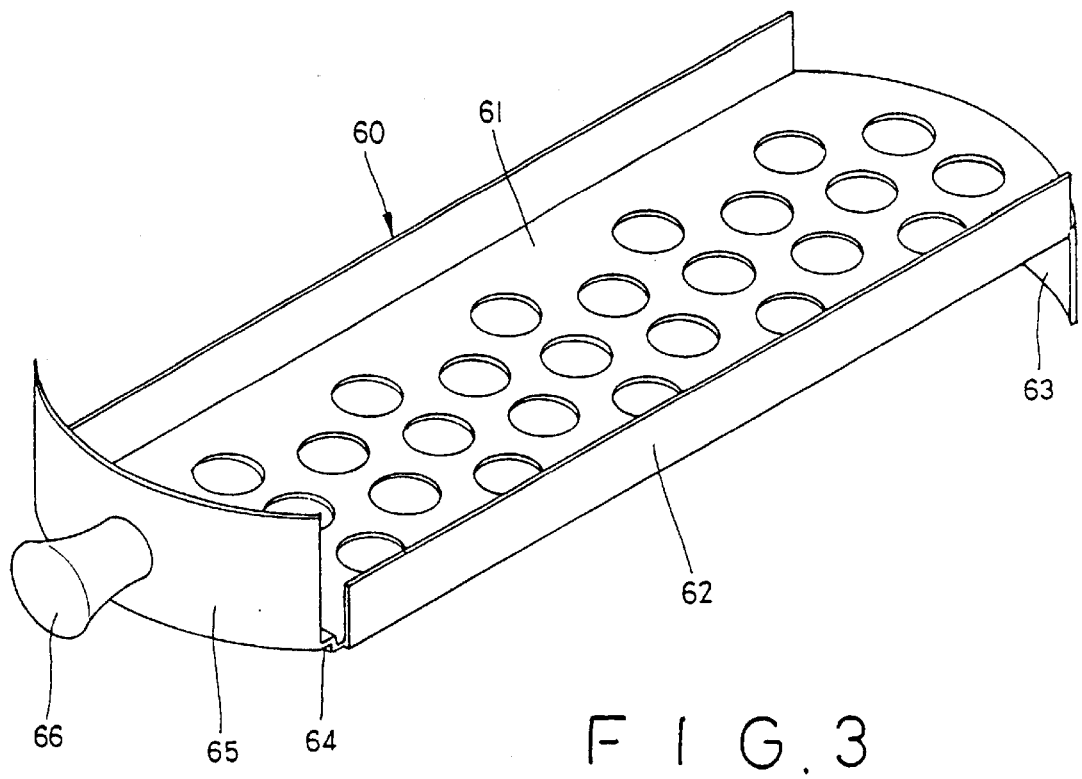
FIG. 3 is a perspective view of a sliding bed of the present invention.
Figure 4:
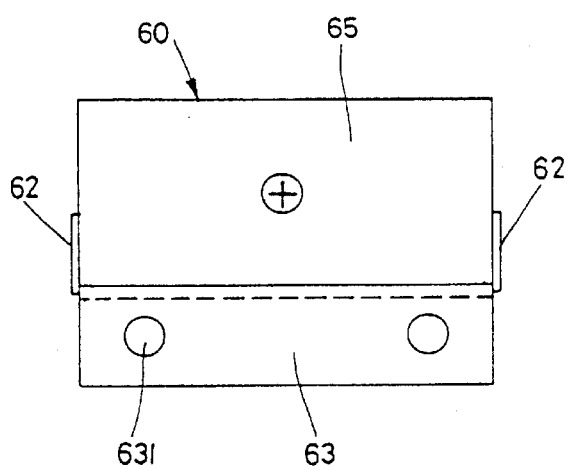
FIG. 4 is a front view of the sliding bed of the present invention.

The present invention comprises a post 10, a furnace 40, a base 50, a sliding bed 60, a support 70, connecting devices 80 and nuts 90.

The post 10 is a hollow barrel with the top and the bottom walls drilled with a number of holes 11 and 12. The top wall 11 has a pair of fixing holes 13 corresponding to each other. One of the fixing holes 13 has a notch 14 at above.

The furnace 40 has a flat surface 41 at its bottom portion, and the flat surface 41 is formed with holes 411 corresponding to the holes 11 on the post 10.

The base 50 has holes 51 corresponding to the holes 12 of the lower end of the post 10 on its top.

The sliding bed 60 comprises a plate 61 with holes thereon and a pair of side plates 62 bending upward. One end of the sliding bed 60 is bent downward to form a sliding plate 63 with a pair of holes 631 thereon, and the other end is bent a upward to form a step 64 and then bent again upwardly to form a cover 65 with a handle 66.

The support 70 is a U-shaped member with threads at respective open ends.

The connecting devices 80 are formed with rods 81, each rod 81 has a thread portion 82 at one end and an enlarged portion 83 at the other end.

Figure 5:
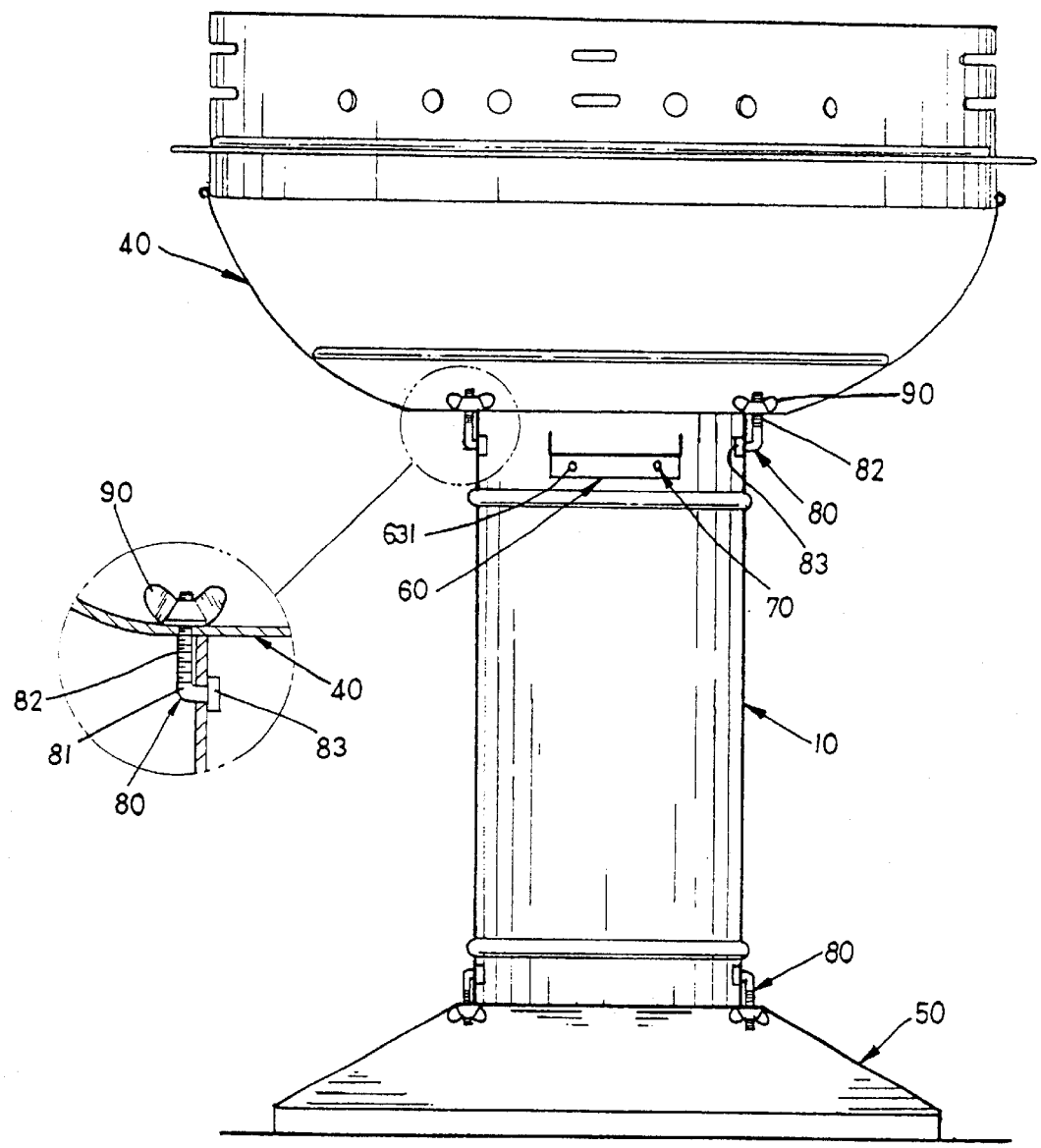
FIG. 5 is a rear view of the present invention.
Figure 6:
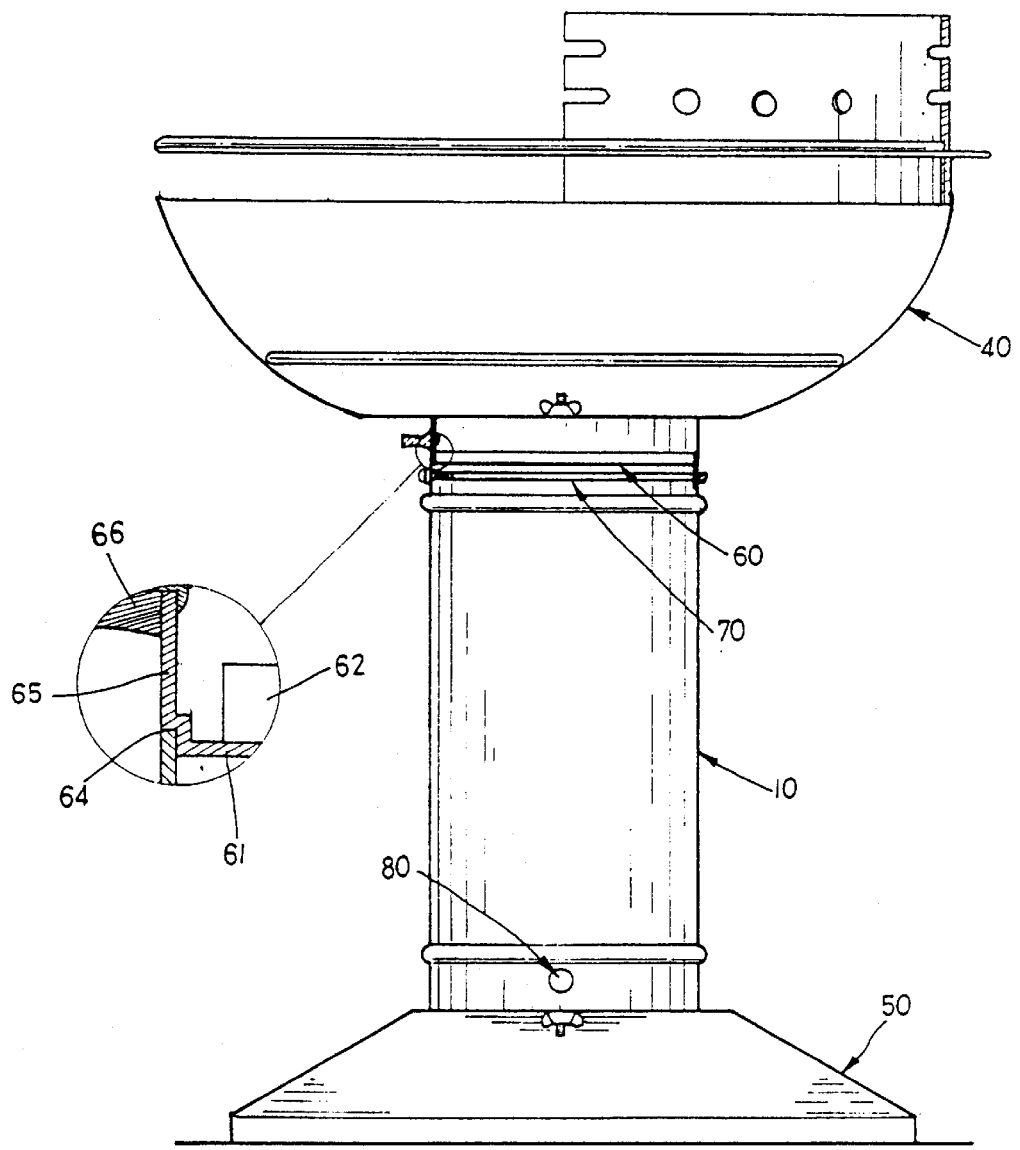
FIG. 6 is a side view of the present invention.

FIG. 5 shows a rear view of an assembled grill of the present invention the thread portions 82 of the connecting devices 80 are inserted through the holes 11 and 12 of the post 10 and turned towards the furnace 40 and the base 50. The block 83 of the connecting device 80 engages with the inner wall of the post 10, and the thread portion 82 of the connecting device 80 is inserted through the hole 11 of the top end of the post 10 and the hole 411 of the furnace 40 and then secured by the nut 90. The thread portion 82 of the connecting device 80 is inserted through the hole 12 of the lower end of the post 10 and the hole 51 of the base 50 and is secured by the nut 90 as well. Thus, the furnace 40, the post 10 and the sliding bed 60 are tightened together. The sliding bed 60 is sleeved into the top portion of the post 10. The step 64 engages with the bottom portion of the notch 14 of the post 10 to form a firmed body. The cover 65 of the sliding bed 60 is engaged with the notch 14 of the post 10. The thread ends 71 of the support 70 are inserted through the fixing holes 13 of the post 10 and the two holes 631 of the sliding bed 60, respectively and secured by nuts at the other ends.

Figure 7:
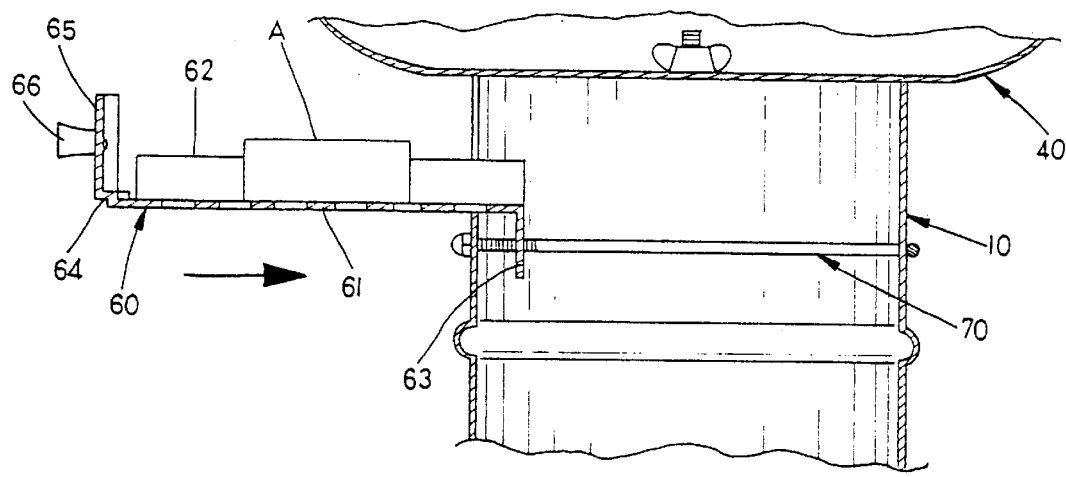
FIG. 7 is a side view of the present invention showing an embers.

FIG. 7 is shown a tinder A being applied. In practice, lift the handle 66 up which brings the step 64 of the sliding bed 60 disengaging from the notch 14, thus the sliding bed 60 may be pulled outwardly. Light up the tinder A located in the plate 61, and then push the sliding bed 60 back into the original position which allows the tinder A to light the charcoal in the furnace 40 from underneath.

Figure 8:
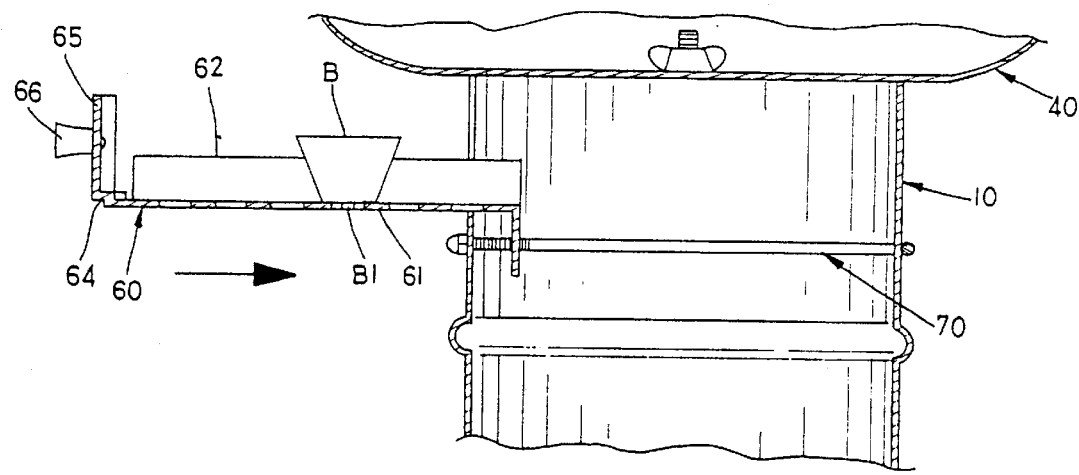
FIG. 8 is a second embodiment of the embers of the present invention.

FIG. 8 has shown another embodiment of the tinder (such as alcohol, kerosene) which is holding in a container B secured by a fixture B1.

I claim:

1. A BBQ grill with an ignition system comprising a post, a furnace, a base, a sliding bed, a support, connecting devices and nuts, and further comprising:

said post having top and bottom walls formed with at least two sets of holes, and said top wall having a pair of fixing holes corresponding to each other, one of said fixing holes having a notch at a top end;

said furnace having a flat surface, and having holes corresponding to said holes of said post;

said base having holes at a top portion corresponding to said holes at the bottom wall of said post;

said sliding bed comprising a plate with holes thereon, a pair of side plates bent upward from respective sides, one end of which being bent downward to form a sliding plate with a pair of holes thereon, and the other end bending upward to form a step and then bending again upwardly to form a cover with a handle thereat;

said support being shaped like an English letter U with threads at respective ends; and said connecting device having a thread portion at one end and an enlarged portion at the other end, wherein said connecting devices and said nuts being applied to tighten said post, said furnace and said base together, and said sliding bed supported on a top portion of said post accommodates a tinder therein which ignites charcoal of the furnace from underneath.

\* \* \* \* \*